US011167850B2

United States Patent
McKee et al.

(10) Patent No.: US 11,167,850 B2
(45) Date of Patent: Nov. 9, 2021

(54) PASSENGER FRIENDLY OVERHEAD REST CABIN CONFIGURATION

(71) Applicant: Rockwell Collins, Inc., Cedar Rapids, IA (US)

(72) Inventors: Jefferey M. McKee, Duvall, WA (US); Ron Moss, Camano Island, WA (US); Travis J. Vaninetti, Bothell, WA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 550 days.

(21) Appl. No.: 16/126,910

(22) Filed: Sep. 10, 2018

(65) Prior Publication Data

US 2020/0180764 A1 Jun. 11, 2020

Related U.S. Application Data

(60) Provisional application No. 62/729,237, filed on Sep. 10, 2018.

(51) Int. Cl.
*B64D 11/00* (2006.01)
*B61D 31/00* (2006.01)

(52) U.S. Cl.
CPC ...... *B64D 11/00* (2013.01); *B64D 2011/0046* (2013.01); *B64D 2011/0061* (2013.01); *B64D 2011/0084* (2013.01)

(58) Field of Classification Search
CPC ............ B64D 11/00; B64D 2011/0046; B64D 2011/0084; B61D 1/08; B61D 31/00; B63B 29/10
See application file for complete search history.

(56) References Cited

U.S. PATENT DOCUMENTS

| 2,455,157 A | 11/1948 | Bigelow |
| 3,044,419 A | 7/1962 | Majnoni |
| 3,144,224 A | 8/1964 | Carroll |
| 5,496,000 A | 3/1996 | Mueller |
| 5,651,733 A | 7/1997 | Schumacher |
| 5,784,836 A | 7/1998 | Ehrick |
| 6,003,813 A | 12/1999 | Wentland et al. |

(Continued)

FOREIGN PATENT DOCUMENTS

WO 2019207211 A1 10/2019

OTHER PUBLICATIONS

International Search Report and Written Opinion dated Dec. 18, 2019 for PCT/US2019/050387.

(Continued)

*Primary Examiner* — Brian M O'Hara
(74) *Attorney, Agent, or Firm* — Suiter Swantz pc llo

(57) ABSTRACT

A passenger rest cabin situated in the overhead crown area of an aircraft provides individual rest compartments along either lateral side of a central longitudinal corridor of limited height. The corridor and entrance thereto is configured to minimize the risk of claustrophobia by providing sensory preparation systems and techniques. Sensory preparation including transitional compartments with variations in video, lighting and ventilation are presented to the passenger to create a more inviting space. The limited height corridor is equipped with a series of handholds, sized and spaced according to the size of the average passenger, to mitigate the strain of traversing the corridor in a bent over position.

18 Claims, 10 Drawing Sheets

(56) References Cited

U.S. PATENT DOCUMENTS

| | | | |
|---|---|---|---|
| 6,073,883 A * | 6/2000 | Ohlmann | B64D 11/00 105/316 |
| 6,152,400 A | 11/2000 | Sankrithi et al. | |
| 6,182,926 B1 * | 2/2001 | Moore | B64D 11/00 244/118.5 |
| 6,305,645 B1 | 10/2001 | Moore | |
| 6,393,343 B1 | 5/2002 | Frey et al. | |
| 6,464,169 B1 | 10/2002 | Johnson et al. | |
| 6,520,451 B1 | 2/2003 | Moore | |
| 6,616,098 B2 | 9/2003 | Mills | |
| 6,659,225 B2 | 12/2003 | Oliges et al. | |
| 6,772,977 B2 | 8/2004 | Dees et al. | |
| 6,808,142 B2 | 10/2004 | Oki | |
| 6,848,654 B1 | 2/2005 | Mills et al. | |
| 6,932,298 B1 | 8/2005 | Mills | |
| 6,986,485 B2 | 1/2006 | Farnsworth | |
| 7,088,310 B2 | 8/2006 | Sanford | |
| 7,156,344 B1 | 1/2007 | Guering | |
| 7,290,735 B2 | 11/2007 | Saint-Jalmes et al. | |
| 7,354,018 B2 | 4/2008 | Saint-Jalmes | |
| 7,389,959 B2 | 6/2008 | Mills | |
| 7,681,951 B2 * | 3/2010 | Doebertin | B64D 11/0604 297/245 |
| 7,762,496 B2 * | 7/2010 | Seiersen | B64D 11/00 244/118.5 |
| 7,823,831 B2 | 11/2010 | Guering | |
| 7,942,367 B2 | 5/2011 | Saint-Jalmes et al. | |
| 8,152,102 B2 | 4/2012 | Warner et al. | |
| 8,162,258 B2 | 4/2012 | Joannis et al. | |
| 8,328,137 B2 | 12/2012 | Sutthoff et al. | |
| 8,534,602 B2 | 9/2013 | Jakubec et al. | |
| 8,602,354 B2 | 12/2013 | Sutthoff et al. | |
| 8,727,277 B2 | 5/2014 | Guering et al. | |
| 8,794,569 B1 | 8/2014 | Ohlmann et al. | |
| 8,844,865 B2 | 9/2014 | Gehm et al. | |
| 8,881,524 B2 | 11/2014 | Andres et al. | |
| 8,905,633 B2 | 12/2014 | Popp et al. | |
| 8,991,756 B2 * | 3/2015 | Papke | B64D 11/00 244/118.6 |
| 9,169,021 B2 | 10/2015 | Pozzi et al. | |
| 9,340,294 B1 | 5/2016 | Keleher et al. | |
| 9,403,465 B2 | 8/2016 | Kircher et al. | |
| 9,456,184 B2 | 9/2016 | Barrou et al. | |
| 9,545,998 B2 | 1/2017 | Lin | |
| 9,550,571 B1 | 1/2017 | Ohlmann et al. | |
| 9,706,242 B2 | 7/2017 | Dame et al. | |
| 9,708,065 B2 | 7/2017 | Sankrithi et al. | |
| 2002/0093564 A1 | 7/2002 | Israel | |
| 2005/0057344 A1 | 3/2005 | Davis et al. | |
| 2005/0178909 A1 | 8/2005 | Mills et al. | |
| 2006/0235753 A1 | 10/2006 | Kameyama | |
| 2007/0034212 A1 | 2/2007 | Brendley et al. | |
| 2007/0125909 A1 | 6/2007 | Seiersen et al. | |
| 2009/0179987 A1 | 7/2009 | Kim | |
| 2010/0140402 A1 | 6/2010 | Jakubec et al. | |
| 2010/0188506 A1 | 7/2010 | Dwyer et al. | |
| 2010/0301163 A1 | 12/2010 | Guering et al. | |
| 2011/0139930 A1 | 6/2011 | Sutthoff et al. | |
| 2011/0253005 A1 | 10/2011 | Sun et al. | |
| 2013/0120162 A1 | 5/2013 | Stehman et al. | |
| 2013/0257688 A1 | 10/2013 | Yamazaki et al. | |
| 2014/0222119 A1 | 8/2014 | Pederson et al. | |
| 2014/0298582 A1 | 10/2014 | Kercher et al. | |
| 2015/0048205 A1 | 2/2015 | Seibt et al. | |
| 2015/0266581 A1 | 9/2015 | Roese et al. | |
| 2015/0266658 A1 | 9/2015 | Tajima | |
| 2015/0358574 A1 | 12/2015 | Henion et al. | |
| 2017/0057637 A1 | 3/2017 | Cole | |
| 2017/0094166 A1 | 3/2017 | Riedel | |
| 2017/0094167 A1 | 3/2017 | Riedel | |
| 2017/0137109 A1 | 5/2017 | Sieben | |
| 2017/0233058 A1 | 8/2017 | Brunaux et al. | |
| 2018/0056846 A1 | 3/2018 | Nasir | |
| 2018/0265201 A1 | 9/2018 | Carlioz et al. | |

OTHER PUBLICATIONS

International Search Report and Written Opinion dated Mar. 24, 2020 for PCT/US2019/050343.
International Search Report and Written Opinion dated Dec. 27, 2019 for PCT/US2019/050357.
International Search Report and Written Opinion dated Mar. 23, 2020 for PCT/US2019/050337.
International Search Report and Written Opinion dated Dec. 13, 2019 for PCTUS2019/050347.
Meyer, David, "Airbus Has a Solution to 17-Hour Flight Hell: Beds in the Cargo Hold", Fortune, Apr. 11, 2018, 2 pages, http://fortune.com/2018/04/11/airbus-zodiac-sleep-cargo-hold/.
Ong, Thuy, "Emirates' new first class suites feature virtual windows and a 'zero-gravity' seat", The Verge, Dec. 1, 2017, 3 pages, https://www.theverge.com/2017/12/1/16723152/emirates-first-class-suites-virtual-windows-zero-gravity-seat.
U.S. Department of Transportation Federal Aviation Administration, Advisory Circular, "Flightcrew Member Rest Facilities", Sep. 19, 2012, AFS-220, AC 117-1, 9 pages.
Flynn, David, Dec. 27, 2013, https://www.ausbt.com.au/the-best-seats-on-a-cathay-pacific-boeing-777-300er-try-the-upstairs-bunk-beds, 1 page.
Bahrami, Ali, Federal Register, vol. 68, No. 74, Apr. 17, 2003, Rules and Regulations, "Overhead Crew Rest Compartments", pp. 18843-18852.
Bahrami, Ali, Federal Register, vol. 77, No. 62, Mar. 30, 2012, Proposed Rules, "Crew Rest Compartments", pp. 19148-19153.
International Search Report and Written Opinion dated Jan. 17, 2020 for PCT/US2019/050367.

* cited by examiner

PASSENGER FRIENDLY OVERHEAD REST CABIN CONFIGURATION

CROSS-REFERENCE TO RELATED APPLICATIONS

This application claims the benefit under 35 U.S.C. §§ 119 and/or 120 of U.S. Provisional Patent Application Ser. No. 62/729,237, filed Sep. 10, 2018. Said provisional patent application Ser. No. 62/729,237 is herein incorporated by reference in its entirety.

FIELD OF THE INVENTIVE CONCEPTS

Embodiments of the inventive concepts disclosed herein relate generally to sleeping compartments onboard an aircraft. More particularly, embodiments of the inventive concepts disclosed herein relate to physical structures configured to reduce passenger anxiety and increase passenger comfort as passengers may enter, transit and exit an overhead rest compartment on board an aircraft.

BACKGROUND

Claustrophobia may occur as a person may enter a confined space. As physical space around a person decreases, the person may experience an uncomfortable claustrophobia effect. One reaction to the uncomfortable effect may include an immediate exit or refrain from entry into the enclosed space.

Aircraft flight may induce personal stress at a first level. Fear of flight may be inherent in some passengers. Sitting in a confined pressurized cabin travelling at high speeds may induce a variable level of flight stress to some passengers.

Combined with flight stress, claustrophobia may heighten a personal stress level as a passenger may enter a closely confined sleeping compartment within the already confined pressurized cabin of the aircraft.

Headroom within an enclosed sleeping area onboard an aircraft may be limited. Head injury and increased discomfort may occur should a passenger attempt to transit such a limited vertical space. Should a passenger be required to bend at the waist in order to transit such a limited vertical space, the passenger may again turn and decide not to enter.

Traditionally, a person may be required to self-mitigate any physical or mental stress one may encounter as the person may enter and transit a confined space onboard a moving vehicle. In particular, a moving aircraft may induce stresses on a passenger which may inhibit successful entry into the confined space. Considerable comfort and revenue may be lost should passengers feel any discomfort or stress as they enter, transit and exit a confined sleeping compartment onboard an aircraft.

Therefore, a need remains for structural and perceptional mitigation of the physical and mental stress a passenger may encounter as the passenger may enter, transit, and exit a sleeping compartment onboard a moving vehicle.

SUMMARY

Accordingly, a system for sensory preparation and ergonomic transit within an enclosed compartment may include a transition compartment configured for transit from an upper vestibule to a corridor and a sensory preparation for mitigating an anxiety arising from movement from the upper vestibule to the corridor. The sensory preparation may include a visual scheme and a tactile scheme.

The corridor may be specifically configured for the sensory preparation, ergonomic passenger movement and functional passenger transit between the transition compartment and a passenger bunk. The corridor may include one or more hand rails to assist the ergonomic movement of a passenger moving within the corridor. The upper vestibule, the transition compartment and the corridor are all longitudinally aligned above a passenger cabin and along a centerline of a vehicle body.

The method for sensory preparation and ergonomic transit within an enclosed compartment may comprise mounting a transition compartment and a corridor within a vehicle body, the transition compartment configured for 1) a transit from an upper vestibule to the corridor and 2) a sensory preparation, the sensory preparation for mitigating an anxiety arising from movement from the upper vestibule to the corridor. The method may further include mounting within the transition compartment and the corridor at least one of a visual presentation and a tactile presentation. Further, the method may present to a passenger the sensory preparation, the sensory preparation including a visual scheme via the visual presentation and a tactile scheme via the tactile presentation.

It is to be understood that both the foregoing general description and the following detailed description are exemplary and explanatory only and are not necessarily restrictive of the inventive concepts as claimed. The accompanying drawings, which are incorporated in and constitute a part of the specification, illustrate embodiments of the inventive concepts and together with the general description, serve to explain the principles of the inventive concepts disclosed herein.

BRIEF DESCRIPTION OF THE DRAWINGS

Implementations of the inventive concepts disclosed herein may be better understood when consideration is given to the following detailed description thereof. Such description may refer to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION

Figure 1:
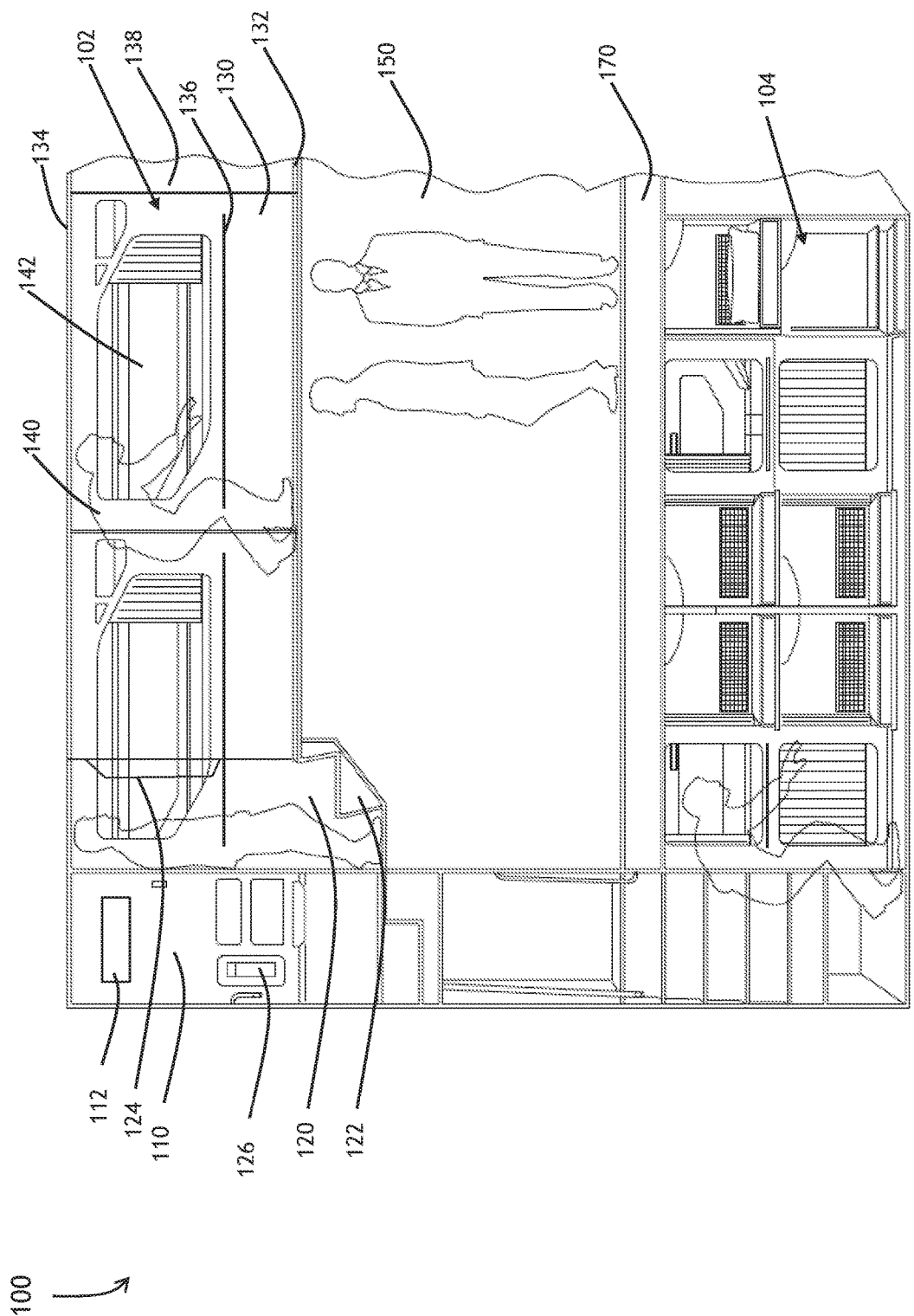
FIG. 1 is a diagram of a system for anxiety mitigation and ergonomic transit within an enclosed compartment in accordance with an embodiment of the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

OVERVIEW

Embodiments of the inventive concepts disclosed herein are directed to a system and related method for employing physical structures configured to reduce passenger anxiety and increase passenger comfort as passengers may enter, transit and exit an overhead rest compartment on board an aircraft. A passenger rest cabin situated in the overhead crown area of an aircraft may provide individual rest compartments along either lateral side of a central longitudinal corridor of limited height. The corridor and entrance thereto may be configured to minimize the risk of claustrophobia by providing sensory preparation systems and techniques. Sensory preparation including transitional compartments with variations in video, lighting and ventilation are presented to the passenger to create a more inviting space. The limited height corridor may be equipped with a series of handholds, sized and spaced according to the size of the average passenger, to mitigate the strain of traversing the corridor in a bent over position.

| Reference Chart | |
|---|---|
| Ref. No. | Description |
| 100 | Overhead Bunk Configuration |
| 102 | Overhead Bunk Compartment |
| 104 | Below Deck Bunk Compartment |
| 110 | Upper Vestibule |
| 112 | Upper Vestibule Sensors |
| 120 | Transition Compartment |
| 122 | Transition Compartment Step |
| 124 | Transition Compartment Hand Rail |
| 126 | Upper Vestibule Crew Station |
| 128 | Forward Crew Station |
| 130 | Corridor |
| 132 | Corridor Floor |
| 134 | Corridor Ceiling |
| 136 | Corridor Hand Rail |
| 138 | Corridor Wall |
| 140 | Passenger |
| 142 | Passenger Bunk |
| 150 | Passenger Cabin |
| 170 | Aircraft Main Deck |
| 200 | Longitudinal view of Overhead Bunk Configuration |
| 210 | Sensory Preparation System and Method |
| 222 | Transition Compartment Active Passive Display |
| 224 | Transition Compartment Airflow System |
| 226 | Transition Compartment Audio System |
| 232 | Corridor Floor Active Passive Display |
| 234 | Corridor Ceiling Active Passive Display |
| 236 | Corridor Lighting |
| 238 | Corridor Wall Active Passive Display |
| 240 | Corridor Audio System |
| 300 | Aircraft Configuration Overview |
| 310 | Upper and Lower Vestibule |
| 400 | Overhead Bunk Side View |
| 500 | Upper Vestibule View |
| 600 | Double Aisle Vestibule Upper and Lower view |
| 700 | Double Aisle Vestibule Longitudinal View |
| 800 | Single Aisle Upper Vestibule Longitudinal View |
| 810 | Single Aisle Upper Vestibule |

FIG. 1

Referring to FIG. 1, a diagram of a system 100 for sensory preparation and ergonomic transit within an enclosed compartment in accordance with an embodiment of the inventive concepts disclosed herein is shown. In one configuration, an aircraft may be fitted with an overhead bunk compartment 102 configured with a number of passenger bunks 142. To access the passenger bunks 142, the aircraft may be configured with an upper vestibule 110 for a passenger 140 to move from a passenger main cabin 150 and access the various compartments sited above the aircraft passenger cabin 150. Once at the top of the upper vestibule 110, the passenger 140 may reach a transition compartment 120 configured functionally for the passenger to move from the upper vestibule 110 to a corridor 130.

An upper vestibule crew station 126 may be configured within the upper vestibule 110 for emergency communications, a jump seat and additional emergency gear. The upper vestibule may be configured with a plurality of upper vestibule sensors 112. Contemplated herein, the upper vestibule sensors may include a visual spectrum camera, an infrared spectrum camera, a smoke sensor, a heat sensor, a radio frequency (RF) energy receiver and an motion sensor.

The transition compartment 120 may be fitted with functional attributes such as a transition compartment step 122 and a transition compartment hand rail 124.

Once through the transition compartment 120 and in the corridor 130, the passenger 140 may walk to one of the passenger bunks 142 to sleep during a cruise portion of the flight. The corridor 130 may be of limited height to accommodate headroom within the passenger cabin 150. This limited height may preclude a passenger 140 from standing upright while within the corridor 130.

Each overhead bunk compartment 102 maintains a corridor floor 132, a corridor ceiling 134 and corridor walls 138 to which some elements of the inventive concepts disclosed herein may be affixed. Each corridor wall 138 may be fitted with a corridor hand rail 136 for passenger 140 use to aid in non-upright walking along the corridor 130.

Below a main deck 170 of the passenger cabin 150, a below deck bunk compartment 160 may accommodate additional passengers.

FIG. 2

Figure 2:
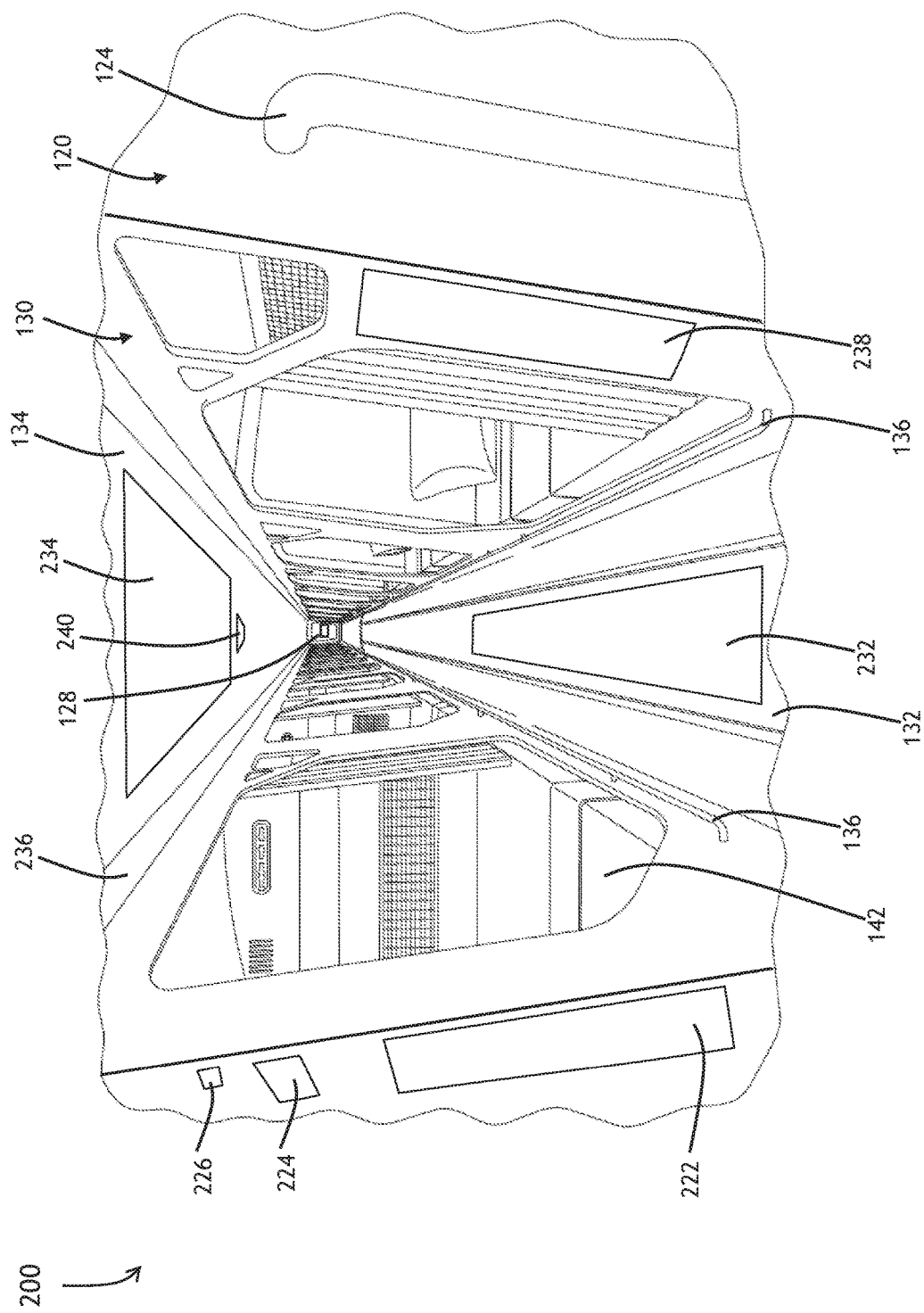
FIG. 2 is a diagram of a transition compartment and corridor in accordance with an embodiment of the inventive concepts disclosed herein.

Referring to FIG. 2, a diagram 200 of a transition compartment 120 and corridor 130 in accordance with an embodiment of the inventive concepts disclosed herein is shown. The transition compartment 120 leads the passenger 140 from the upper vestibule 110 to the corridor 130.
Transition Compartment Within the transition compartment 130, embodiments of the inventive concepts disclosed herein may employ a sensory preparation system and method 210 including hardware and techniques to deceive the passenger 140 to feel comfortable within the enclosed space. Akin to a simulator, elements of the sensory preparation system 210 may operate in concert to deceive the passenger's senses and create a sense of calm to mitigate a claustrophobic feeling the passenger may have while entering the enclosed compartments.

Should the passenger 140 feel less than comfortable about entering the transition compartment 120 or the corridor 130, the passenger may turn and exit the space. More importantly, the passenger may decide to refrain from returning to the passenger bunks 142 and experience a less than optimal flight experience.

Within the transition compartment, the sensory preparation system and method 210 may employ a transition compartment active and/or passive display 222 configured for display of a visual image designed for sensory preparation of the passenger 140. In one example, an active display 222 may include a virtual window receiving a video signal from an external source and display the virtual window within the transition compartment 120. For example, a sensor mounted to capture an image external to the aircraft may transmit the external image to the active display 222. It is further contemplated the virtual window may be sited on the walls, floor and ceiling of the transition compartment 120 to create a visual sensory preparation to relieve passenger apprehension.

In one embodiment, a passive technique to mitigate passenger claustrophobia may include mounting an actual window within the corridor ceiling 134 and/or the transition compartment 120 ceiling. In this manner, a passenger 140 may actually be curious about continuing entry in to the corridor 130 and decide to continue movement from the transition compartment 120 into the corridor 130.

In another embodiment, the sensory preparation system and method 210 may employ a screen based virtual depiction within the transition compartment active display 222. The transition compartment active display 222 may include and a two-dimensional and a three-dimensional virtual depiction. For example, a two-dimensional virtual depiction displayed on transition compartment active passive display 222 may include a forest scene or a beach scene to calm the passenger 140. Similarly, a three-dimensional virtual depiction may include a scene creating an illusion that the transition compartment 120 may be larger than actual.

The sensory preparation system and method 210 may also employ a transition compartment airflow system 224 configured for a tactile feel and/or olfactory sensory preparation of the passenger 140. For example, the airflow system 224 may generate a fresh air smell and a velocity simulating a fresh breeze to the passenger within the transition compartment 120. In another example, the transition compartment airflow system 224 may generate an ocean smell to accompany the visual depiction of a walk on the beach. Again, efforts here may be combined and coordinated to employ a simulator-like sensory preparation so the passenger may feel welcome and secure to continue down the corridor 130 to the passenger bunk 142.

The sensory preparation system and method 210 may employ additional measures to relax a passenger. Facial recognition techniques via a visual spectrum camera within the upper vestibule sensors 112 sited within the upper vestibule 110 may offer an individual passenger 140 a sensory preparation of his/her choosing. For example, an individual passenger may opt to self-disclose a calming experience tailored to him/her. The sensory preparation system and method 210 may receive the signal from the facial recognition camera and actively tailor the sensory preparation to the individual passenger. In addition, one of the additional upper vestibule sensors 112 may "recognize" (via e.g., wireless RF signals) the passenger and send input to the sensory preparation system and method 210. In this manner, the individual passenger may feel more welcome and invited to enter the upper vestibule 110, the transition compartment 120 and the corridor 130 on the way to his/her bunk 142.

In another embodiment of the inventive concepts disclosed herein, the sensory preparation system and method 210 may administer an olfactory agent to induce sleepiness to a consenting passenger 140. Contemplated herein, the sensory preparation system and method 210 may include within the airflow system 224 an herbal supplement or medication to aid in the passenger 140 falling asleep. For example, the airflow system 224 may include an herbal supplement such as Chamomile, Lavender, Ginkgo biloba and/or Valerian.

The airflow system 224 may further include a temporary dose of gaseous medication to a passenger 140 such as Serotonin and Melatonin within the airflow as the facially recognized and consenting passenger 140 may pass through the transition compartment. In this manner, the passenger 140 may experience a rest session specifically tailored to the passenger 140.

In addition, the sensory preparation system and method 210 may employ additional preparation hardware and techniques to target additional senses of the passenger 140. A transition compartment audio 226 may further the sensory preparation with audible and/or inaudible signals. For example, the transition compartment audio 226 may generate sounds of the surf to accompany the ocean breeze and beach scene describe above. The sensory preparation system and method 210 may direct the transition compartment audio 226 to generate noise canceling signals to offset, for example, ambient airflow noise or ambient engine noise.

Corridor

Within the corridor 130, embodiments of the inventive concepts disclosed herein may employ similar hardware and techniques to employ sensory preparation upon the passenger 140. Mounted within the corridor ceiling 134, the sensory preparation system and method 210 may direct a corridor ceiling active passive display 234 to generate active and/or passive images to calm and invite the passenger 140. An active image may include a video depiction of an accurate sky view above the aircraft. In another example, the corridor ceiling active passive display 234 may present the actual sky above the aircraft received from an onboard camera. In another exemplary embodiment, the corridor ceiling active passive display 234 may depict a three-dimensional image of a distant ceiling deceiving the senses of the passenger to believe the corridor ceiling 134 is more distant than actual.

Similarly, the corridor wall active passive display 238 and corridor floor active passive display 232 may generate active and/or passive images to employ sensory preparation and lure the passenger 140 happily into the passenger bunk 142.

Additionally, the sensory preparation system and method 210 may direct a corridor audio system 240 to employ audible sounds and/or active noise canceling signals to mitigate any frequencies deemed uncomfortable to a sleeping passenger 140.

Structurally, the corridor may be fitted with corridor hand rails 136. In embodiments, the corridor hand rails 136 may be optimally sited where the passenger 140 may comfortably walk down the corridor using the corridor hand rails 136 for support. In one example, the corridor hand rails 136 may be mounted within 36 inches of the corridor floor 132. In another example, the corridor hand rails 136 may be optimally mounted 10 inches from the corridor floor 132 to accommodate a desired passenger height. In situations where the passenger average height may be greater, the corridor hand rails 136 may be optimally mounted 24 inches above the corridor floor 132. In yet another embodiment, the corridor hand rails 136 may be configured with two sets of parallel rails on each corridor wall.

A forward crew station 128 may be sited in the corridor area opposite the upper vestibule 110. In some embodiments this opposite area may be in a forward area of the overhead bunk compartment 102. Similar to the upper vestibule crew station 126, the forward crew station 128 may be equipped with a jump seat, crew communications and additional emergency gear.

In one embodiment, the sensory preparation system and method 210 corridor ceiling display 234 may display an active view of a star scene akin to an overhead view one may experience in a planetarium. In another embodiment, the sensory preparation system and method 210 may coordinate each display and sensory preparation aspect according to the local time of day outside the aircraft. For example, during a sunrise the sensory preparation may display a sunrise or sunset with associated colors in the corridor 130 and transition compartment 120.

In another embodiment, the sensory preparation system and method 210 may tailor the sensory preparation to a destination of the aircraft. For example, on a flight to Paris the sensory preparation system and method 210 may direct a coordination of the sensory preparation to display a walk along the Seine River with associated visuals, sounds and smells according to actual experience in that location. In one embodiment, the sensory preparation system and method 210 may coordinate including video, audio, tactile and olfactory presentations to generate a specific event or specific location. In this manner, the passenger 140 may experience less claustrophobia and a greater sense of security in moving from the transition compartment 120 to the corridor 130.

FIG. 3

Figure 3:
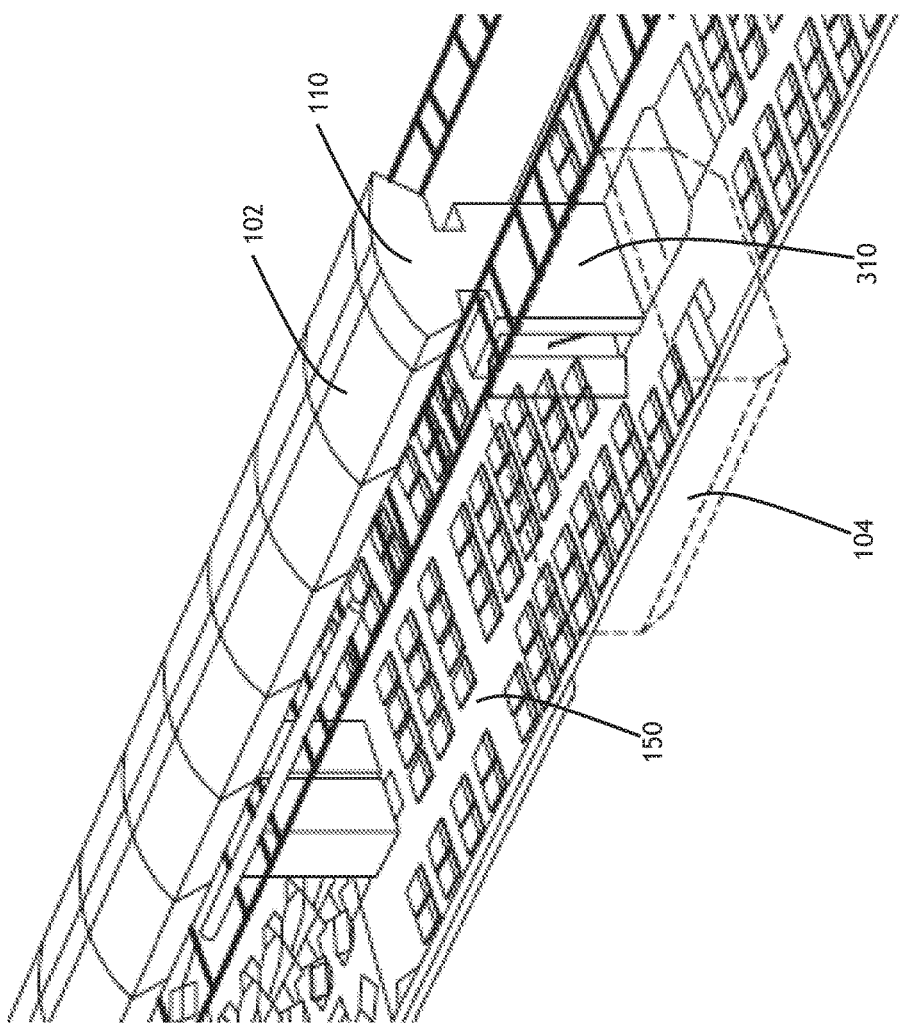
FIG. 3 is a diagram of an overview of an aircraft configured with an overhead bunk compartment exemplary of an embodiment of the inventive concepts disclosed herein.

Referring to FIG. 3, a diagram of an overview 300 of an aircraft configured with an overhead bunk compartment 102 exemplary of an embodiment of the inventive concepts disclosed herein is shown. Within a body of an aircraft, multiple cabin configurations may allow operator flexibility with seating, lavatory areas and bulkheads. Here, one embodiment of the inventive concepts disclosed herein may employ the overhead bunk compartment 102 above the main passenger cabin 150 as well as a below deck bunk compartment 104 to accommodate passengers 140 who may wish to sleep during flight.

A bi-directional vestibule 310 including the upper vestibule 110 may allow for passenger transit between each bunk compartment 102 104 and the main passenger cabin 150.

FIG. 4

Figure 4:
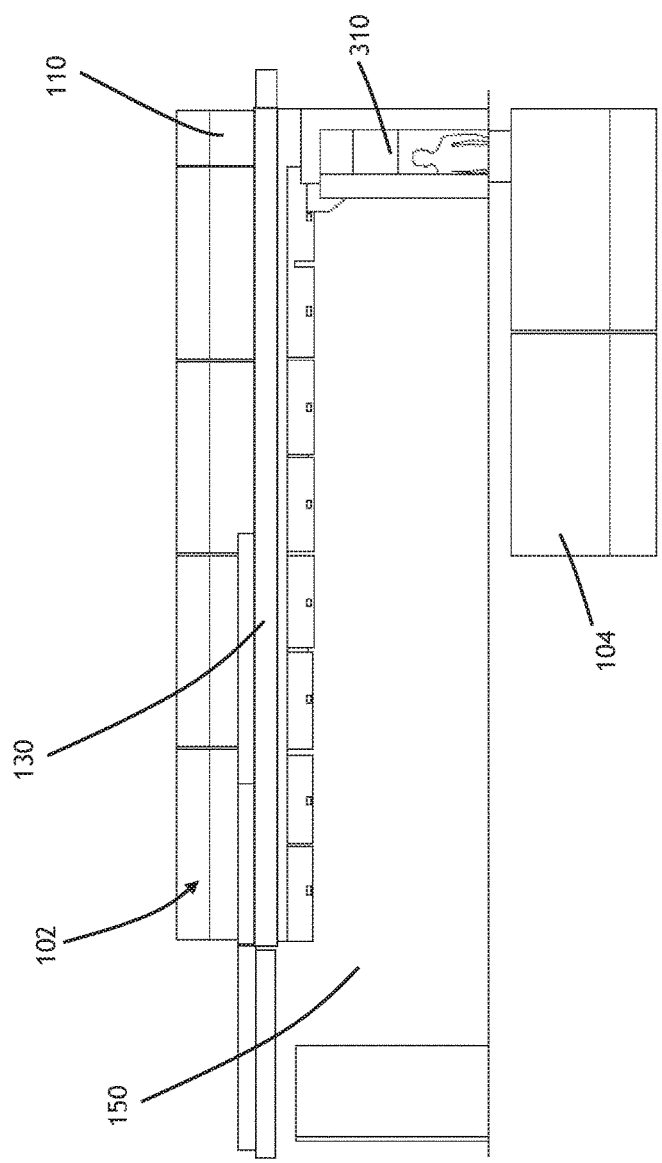
FIG. 4 is a diagram of an overhead bunk side view exemplary of one embodiment of the inventive concepts disclosed herein.

Referring to FIG. 4, a diagram of an overhead bunk side view 400 exemplary of one embodiment of the inventive concepts disclosed herein is shown. Overhead bunk compartment 102 may include a variable number of bunks 142 to offer flexibility to the operator.

FIG. 5

Figure 5:
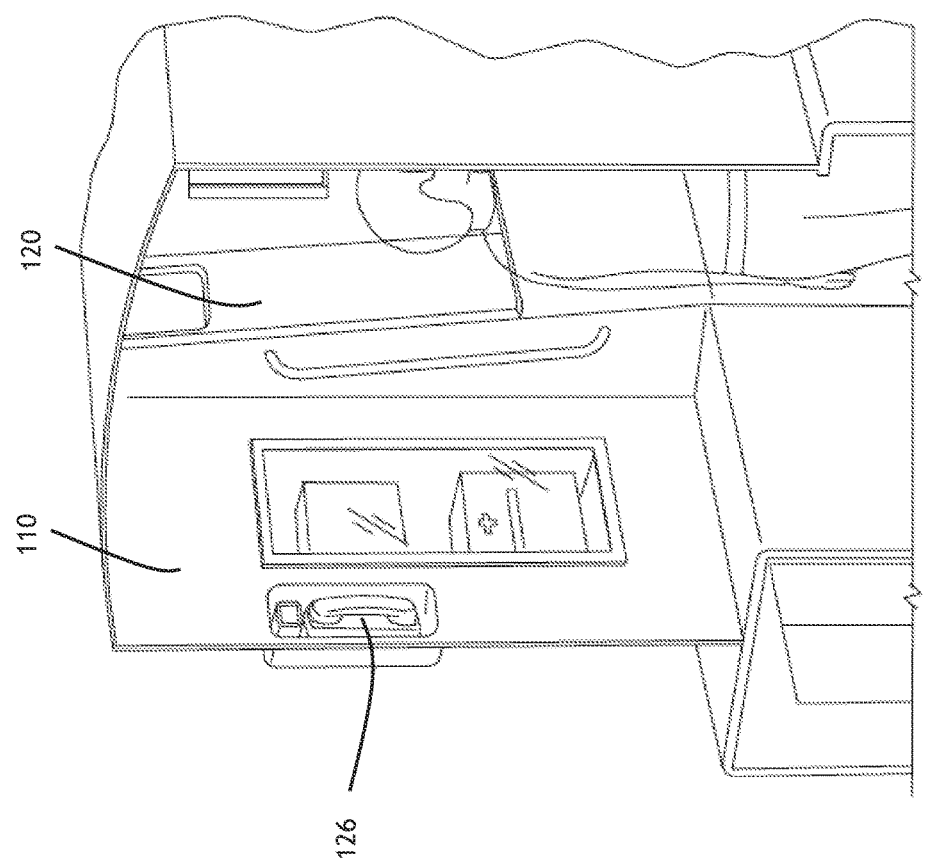
FIG. 5 is a diagram of an upper vestibule in accordance with one embodiment of the inventive concepts disclosed herein.

Referring to FIG. 5, a diagram of an upper vestibule aspect view 500 in accordance with one embodiment of the inventive concepts disclosed herein is shown. The upper vestibule 110 may include standard safety equipment found on an aircraft including a first aid kit, defibrillator and communications devices.

FIG. 6

Figure 6:
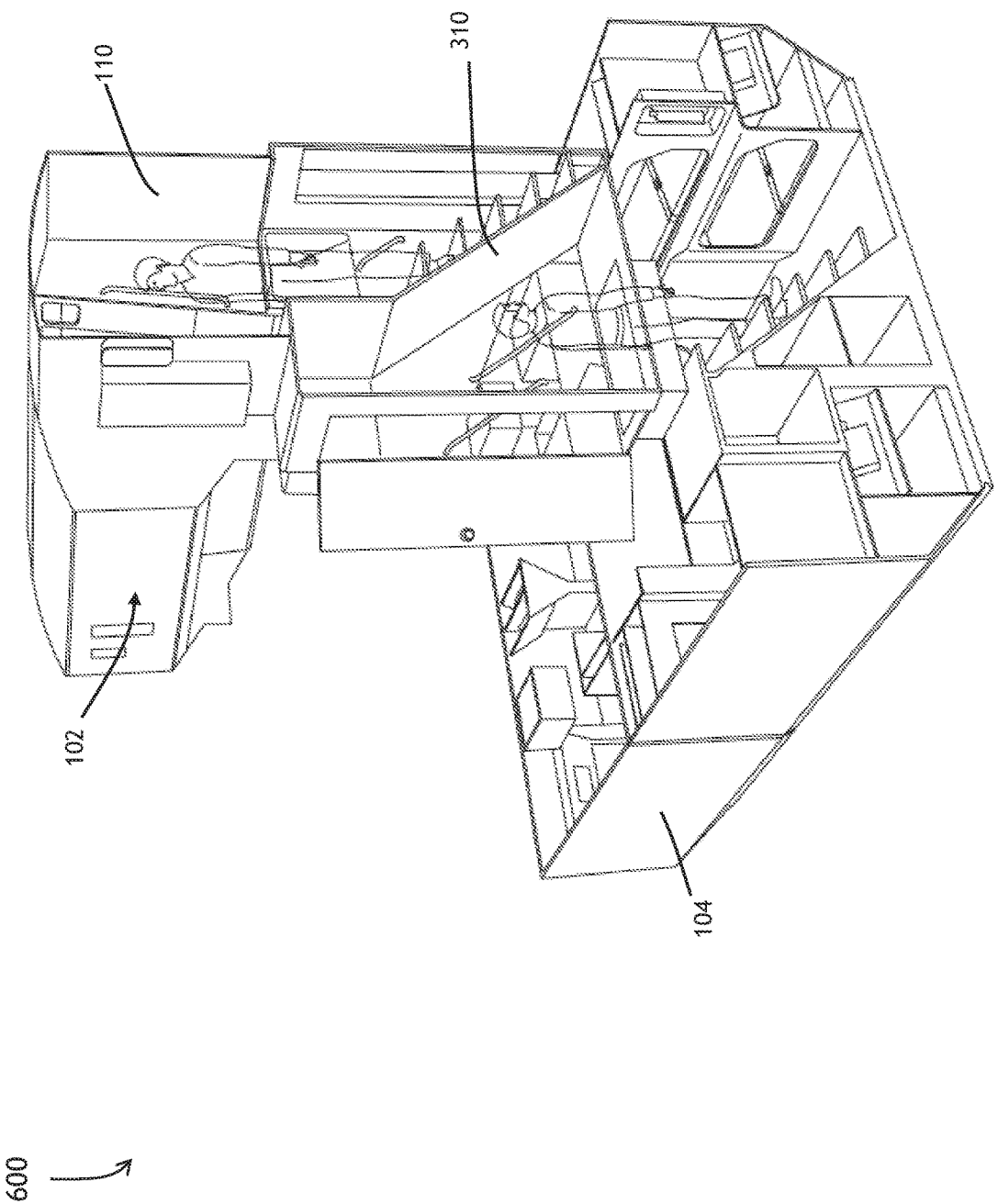
FIG. 6 is a diagram of a double aisle entry vestibule exemplary of one embodiment of the inventive concepts disclosed herein.

Referring to FIG. 6, a diagram of a double aisle entry vestibule aspect view 600 exemplary of one embodiment of the inventive concepts disclosed herein is shown. Within an aircraft configured with double aisles, the bi-directional vestibule 310 may offer passengers room for movement up the upper vestibule 110 as well as movement to the below deck bunk compartment 104.

FIG. 7

Figure 7:
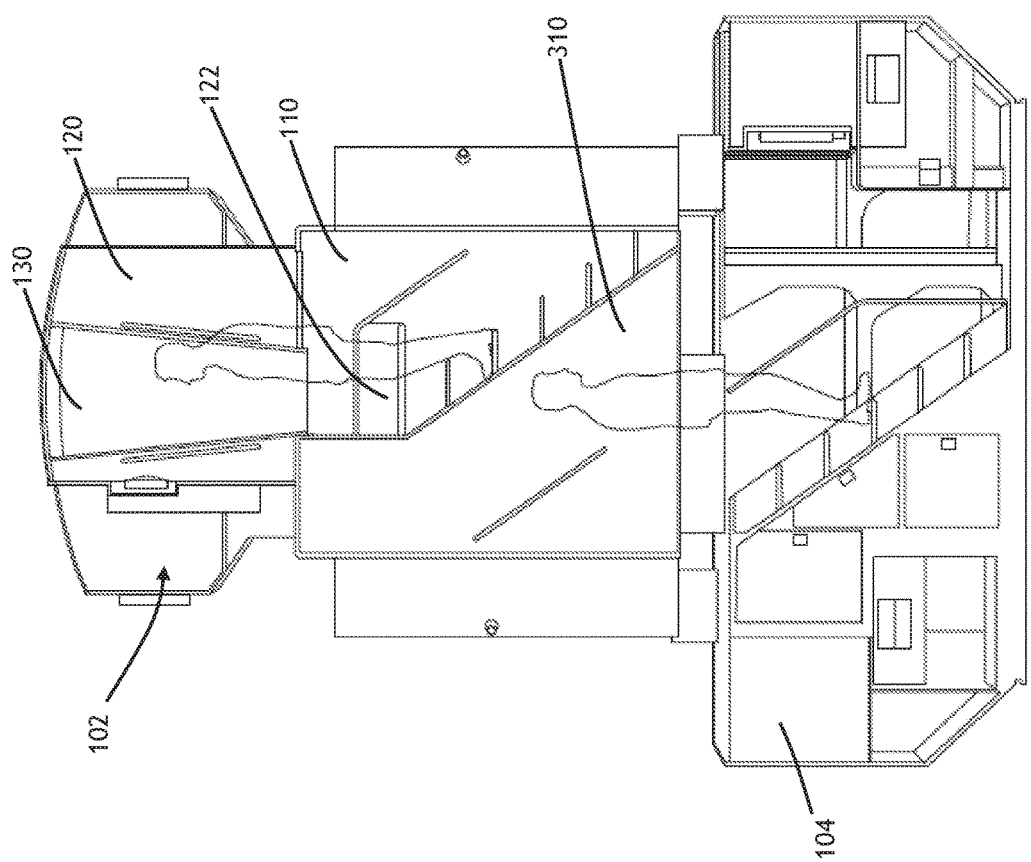
FIG. 7 a diagram of a double aisle entry vestibule longitudinal view associated with one embodiment of the inventive concepts disclosed herein.

Referring to FIG. 7, a diagram of a double aisle entry vestibule longitudinal view 700 associated with one embodiment of the inventive concepts disclosed herein is shown. The bi-directional vestibule 310 may offer enough room for the passenger 140 to simultaneously access both the upper vestibule 110 and the below deck bunk compartment 104.

FIG. 8

Figure 8:
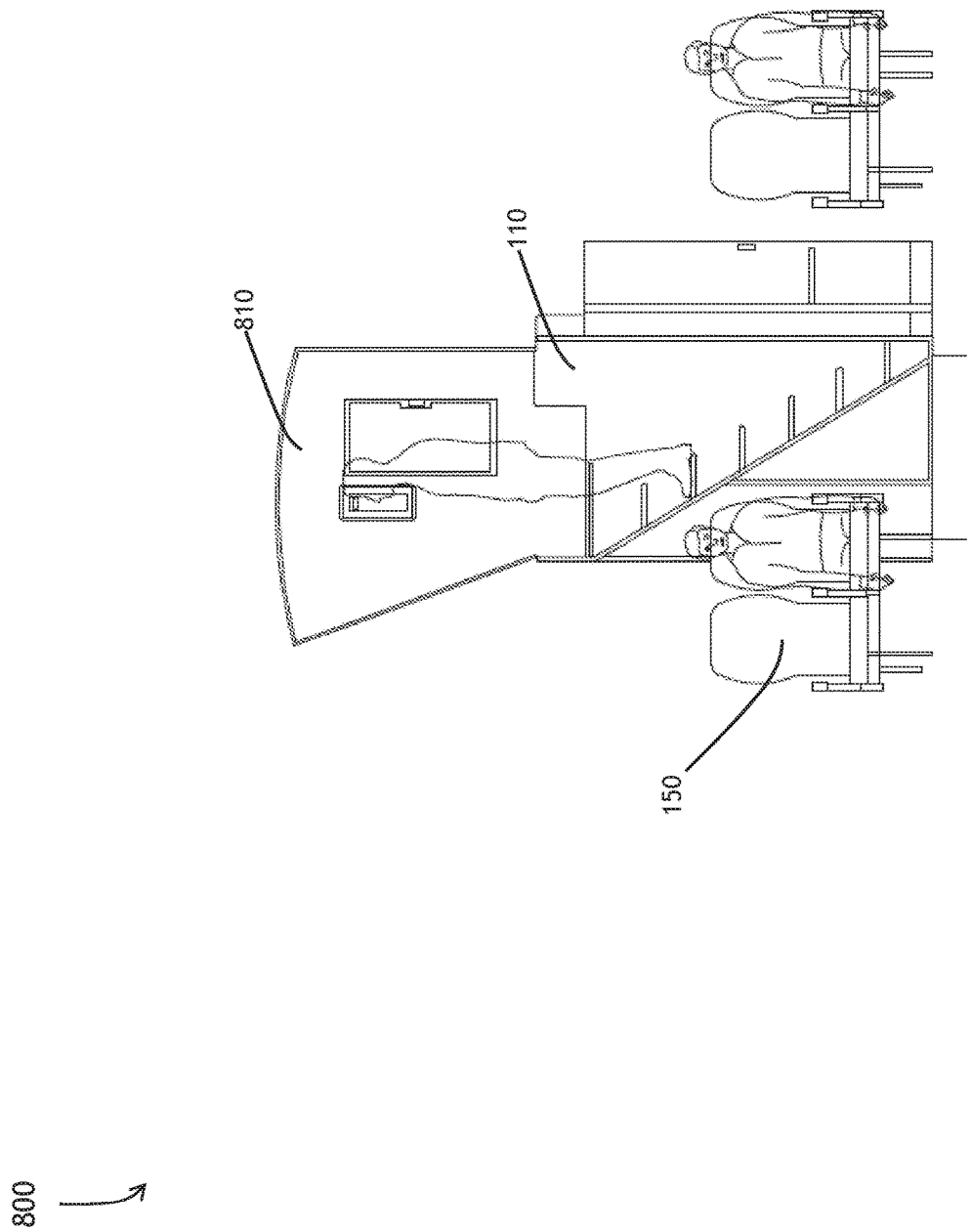
FIG. 8 is a diagram of a single aisle upper vestibule exemplary of one embodiment of the inventive concepts disclosed herein.
Figure 9:
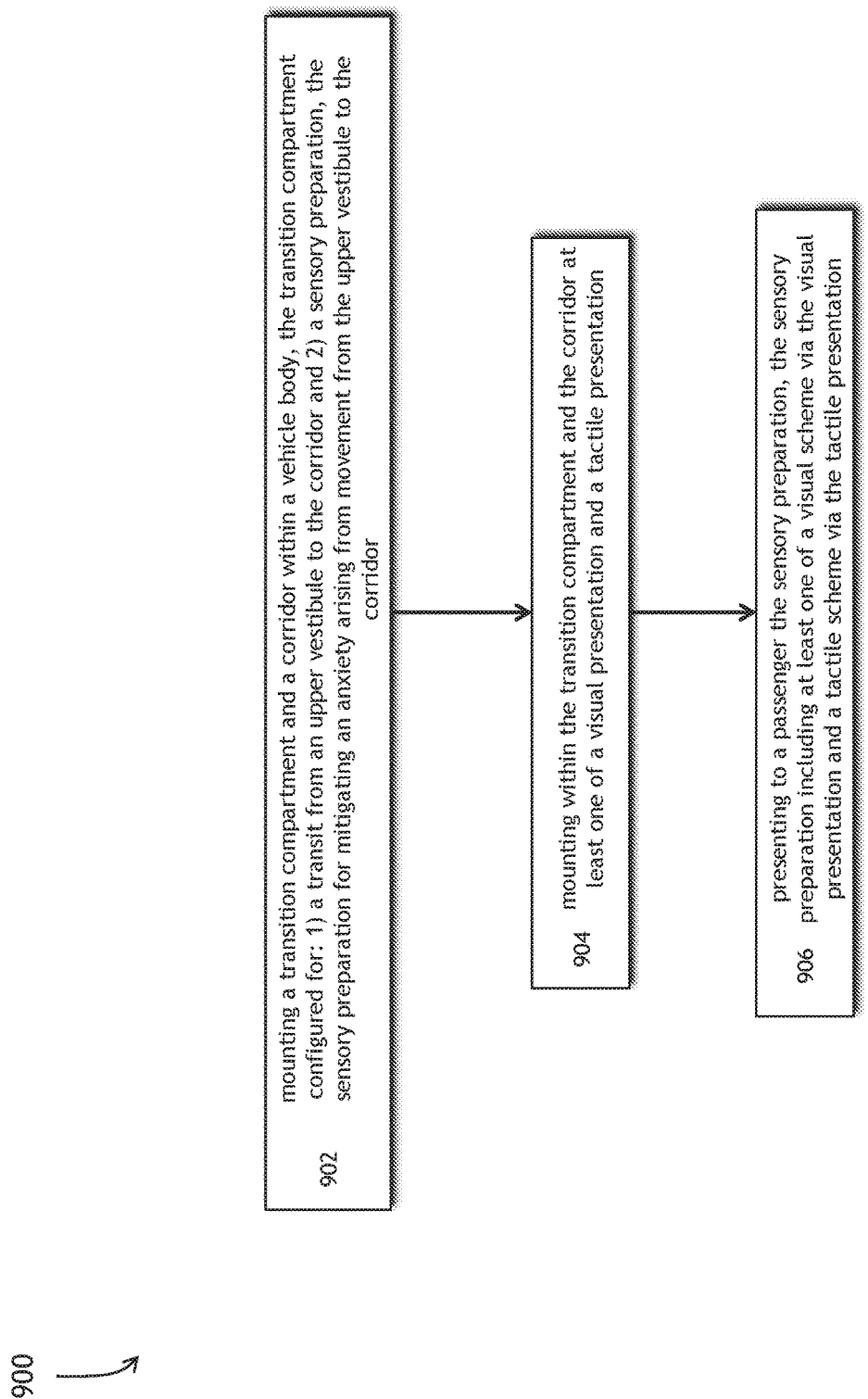
FIG. 9 is a flowchart depicting a method for sensory preparation exemplary of one embodiment of the inventive concepts disclosed herein.

Referring to FIG. 8, a diagram of a single aisle upper vestibule longitudinal view 800 exemplary of one embodiment of the inventive concepts disclosed herein is shown. A single aisle upper vestibule 810 may offer flexibility to the operator. Steps within the single aisle vestibule 810 may lead the passenger 140 from the main cabin 150 to the upper vestibule 110, the transition compartment 120, the corridor 130 and eventually the bunk 142.

FIG. 9

Referring to FIG. 8, 9 method for sensory preparation exemplary of one embodiment of the inventive concepts disclosed herein is shown. A method 900 may include, at a step 902, mounting a transition compartment and a corridor within a vehicle body, the transition compartment configured for: 1) a transit from an upper vestibule to the corridor and 2) a sensory preparation, the sensory preparation for mitigating an anxiety arising from movement from the upper vestibule to the corridor. The method may continue at a step 904, with mounting within the transition compartment and the corridor at least one of a visual presentation and a tactile presentation. The method may also include a step 906, of presenting to a passenger the sensory preparation, the sensory preparation including at least one of a visual scheme via the visual presentation and a tactile scheme via the tactile presentation.

FIG. 10

Figure 10:
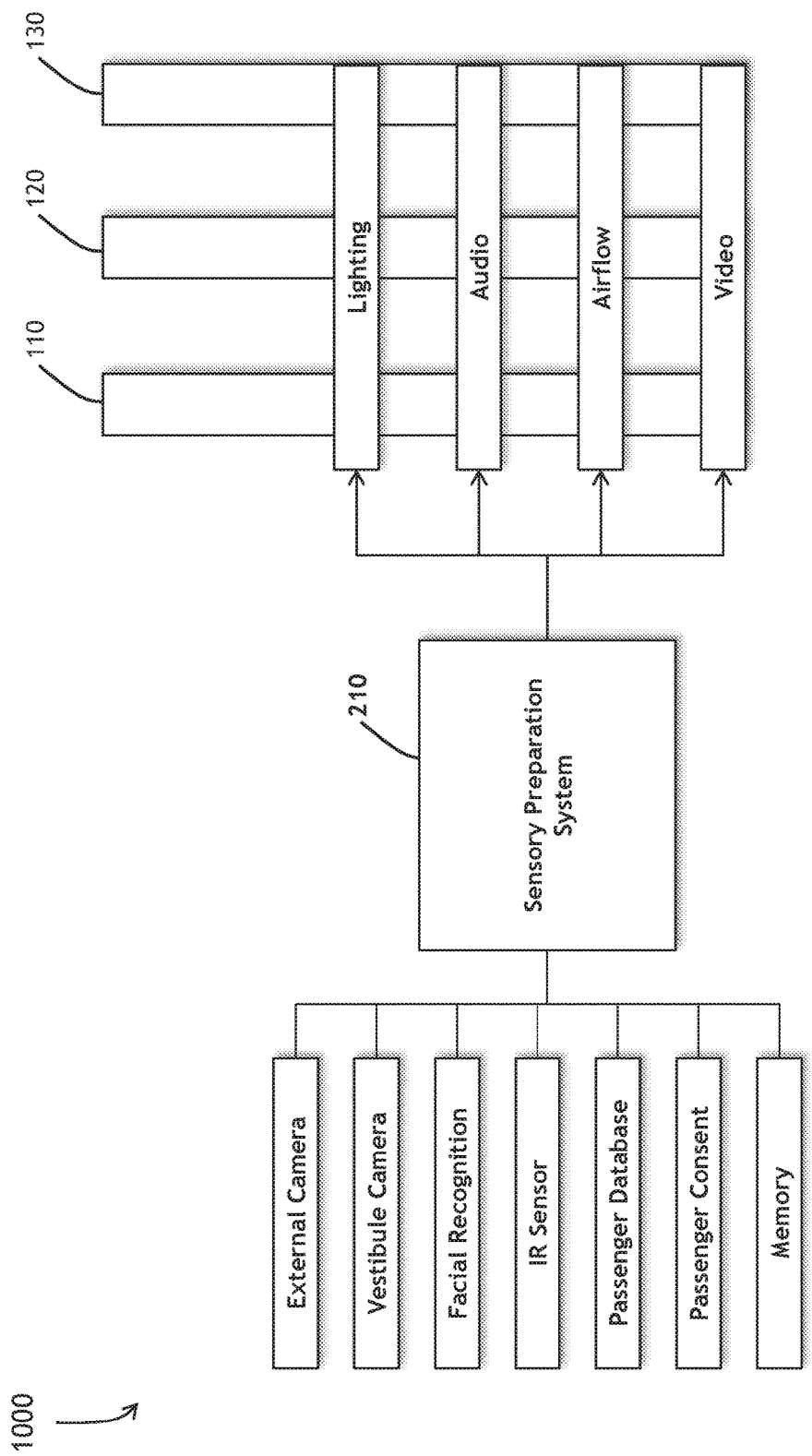
FIG. 10 is an exemplary system for sensory preparation in accordance with an embodiment of the inventive concepts disclosed herein.

Referring to FIG. 10, a system for sensory preparation exemplary of one embodiment of the inventive concepts disclosed herein is shown. The sensory preparation system and method 210 may include a plurality of inputs comprising: an external camera, a vestibule camera, a facial recognition system, an IR sensor, a Passenger database, a passenger consent, and a memory. The sensory preparation system and method 210 may also comprise a plurality of outputs including lighting, audio, airflow, and video. As described herein, the sensory preparation system and method 210 may employ the variety of inputs and plurality of outputs to effectively apply the sensory preparation tailored to the specific passenger 140.

CONCLUSION

Specific blocks, sections, devices, functions, processes and modules may have been set forth. However, a skilled technologist will realize that there are many ways to partition the system, and that there are many parts, components, processes, modules or functions that may be substituted for those listed above.

Skilled artisans will recognize that the state of the art has progressed to the point where there may be little distinction left between hardware, software, and/or firmware implementations of aspects of systems; the use of hardware, software, and/or firmware is generally (but not always, in that in certain contexts the choice between hardware and software can become significant) a design choice representing cost vs. efficiency tradeoffs.

Additionally, implementations of embodiments disclosed herein may include executing a special-purpose instruction sequence or invoking circuitry for enabling, triggering, coordinating, requesting, or otherwise causing one or more occurrences of virtually any functional operations described herein.

While particular aspects of the inventive concepts disclosed herein have been shown and described, it will be apparent to those skilled in the art that, based upon the teachings herein, changes and modifications may be made without departing from the inventive concepts described herein and their broader aspects and, therefore, the appended claims are to encompass within their scope all such changes and modifications as are within the true spirit and scope of the subject matter described herein.

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently.

What is claimed is:

1. A system for passenger access sensory preparation and ergonomic transit within an enclosed compartment, comprising:
   a transition compartment configured for: 1) a transit from an upper vestibule to a corridor and 2) a coordinated presentation of sensory measures directed to a user of the transition compartment;
   the coordinated presentation comprising at least one of: a visual scheme and a tactile scheme;
   the corridor configured for: 1) the coordinated presentation, 2) an ergonomic passenger movement and 3) a functional passenger transit between the transition compartment and a passenger bunk, the corridor including at least one hand rail to assist the ergonomic movement of a passenger moving within the corridor, the at least one hand rail comprises a pair of single pole hand rails longitudinally extending the length of the corridor mounted on opposite walls of the corridor;
   wherein the upper vestibule, the transition compartment and the corridor are longitudinally aligned: 1) above a passenger cabin and 2) along a centerline of a vehicle body.

2. The system of claim 1, wherein the transition compartment further includes at least one of: a vertical step from the upper vestibule to the corridor and at least one hand rail configured for passenger assistance.

3. The system of claim 1, wherein the visual scheme further includes at least one light emitting diode (LED) adaptable for a variable color and a variable illumination.

4. The system of claim 1, wherein the visual scheme further includes at least one of a virtual window, an actual window, a screen based virtual depiction and a two-dimensional and a three-dimensional virtual depiction.

5. The system of claim 1, wherein the coordinated presentation further includes at least one of: an active wall covering, a passive wall covering, an active floor covering, a passive floor covering, an active ceiling covering and a passive ceiling covering.

6. The system of claim 1, wherein the tactile scheme further includes at least one of: a variable air temperature, an olfactory modified airflow, a variable air pressure, a variable air velocity and a variable airflow direction.

7. The system of claim 1, wherein the coordinated presentation further includes at least one aural presentation comprising: an audible aural presentation, a noise canceling audio signal and an audible presentation aligned with at least one visual scheme.

8. The system of claim 1, wherein the pair of single pole hand rails is mounted substantially within 36 inches of a floor of the corridor.

9. The system of claim 1, wherein the pair of single pole hand rails is segmented to comprise at least two segments longitudinally mounted on opposite walls of the corridor.

10. A method for passenger access and ergonomic transit within an enclosed compartment, comprising:
   mounting a transition compartment and a corridor within a vehicle body, the transition compartment configured for: 1) a transit from an upper vestibule to the corridor and 2) a coordinated presentation of sensory measures directed to a user of the transition compartment;
   mounting within the transition compartment and the corridor at least one of a visual presentation and a tactile presentation;
   presenting to a passenger the coordinated presentation, the coordinated presentation including at least one of a visual scheme via the visual presentation and a tactile scheme via the tactile presentation;
   the corridor configured for: 1) the coordinated presentation, 2) an ergonomic passenger movement and 3) a functional passenger transit between the transition compartment and a passenger bunk, the corridor including at least one hand rail to assist the ergonomic movement of a passenger moving within the corridor, the at least one hand rail comprises a pair of single pole hand rails longitudinally extending the length of the corridor mounted on opposite walls of the corridor;
   wherein the upper vestibule, the transition compartment and the corridor are longitudinally aligned: 1) above a passenger cabin and 2) along a centerline of the vehicle body.

11. The method of claim 10, wherein the coordinated presentation further includes a passenger recognition scheme and a tailored presentation based on the passenger recognition scheme.

12. The method of claim 10, wherein the tactile scheme further includes at least one of a variable air temperature, an olfactory modified airflow, a variable air pressure, a variable air velocity and a variable airflow direction.

13. The method of claim 10, wherein the coordinated presentation further includes at least one of: an active wall covering, a passive wall covering, an active floor covering, a passive floor covering, an active ceiling covering and a passive ceiling covering.

14. The method of claim 10, wherein the visual scheme further includes at least one of a virtual window, an actual window, a screen based virtual depiction and a two-dimensional and a three-dimensional virtual depiction.

15. The method of claim 10, wherein the visual scheme further includes at least one light emitting diode (LED) adaptable for a variable color and a variable illumination.

16. The method of claim 10, wherein the coordinated presentation further includes at least one aural presentation preparation comprising, an audible aural presentation, a noise canceling audio signal and an audible presentation aligned with at least one visual scheme.

17. The method of claim 10, wherein the pair of single pole hand rails is mounted substantially within 36 inches of a floor of the corridor.

18. The method of claim 10, wherein the pair of single pole hand rails is segmented to comprise at least two segments longitudinally mounted on opposite walls of the corridor.

* * * * *